(12) United States Patent
Lincoln et al.

(10) Patent No.: US 11,474,018 B2
(45) Date of Patent: Oct. 18, 2022

(54) FLUORESCENCE ENHANCED LIDAR BASED PARTICULATE DETECTOR

(71) Applicant: Carrier Corporation, Palm Beach Gardens, FL (US)

(72) Inventors: David L Lincoln, Cromwell, CT (US); Peter R Harris, West Hartford, CT (US); Michael J Birnkrant, Wethersfield, CT (US); Jennifer M Alexander, Glastonbury, CT (US); Michael T Gorski, Clinton, CT (US)

(73) Assignee: Carrier Corporation, Palm Beach Gardens, FL (US)

( * ) Notice: Subject to any disclaimer, the term of this patent is extended or adjusted under 35 U.S.C. 154(b) by 53 days.

(21) Appl. No.: 17/101,121

(22) Filed: Nov. 23, 2020

(65) Prior Publication Data

US 2021/0172851 A1    Jun. 10, 2021

Related U.S. Application Data

(60) Provisional application No. 62/943,841, filed on Dec. 5, 2019.

(51) Int. Cl.
*G01N 15/06* (2006.01)
*G08B 17/107* (2006.01)
*G01N 15/00* (2006.01)

(52) U.S. Cl.
CPC ........... *G01N 15/06* (2013.01); *G08B 17/107* (2013.01); *G01N 2015/0046* (2013.01)

(58) Field of Classification Search
CPC ........... G01N 15/06; G01N 2015/0046; G08B 17/107

(Continued)

(56) References Cited

U.S. PATENT DOCUMENTS 5,999,250 A * 12/1999 Hairston ............ G01N 15/1436
356/336
6,593,582 B2    7/2003 Lee et al.
(Continued)

FOREIGN PATENT DOCUMENTS

CN    101072995 A * 11/2007 ............. G01N 15/00
CN    101858847 A * 10/2010
(Continued)

OTHER PUBLICATIONS

European Search Report for Application No. 20211918.6 dated Apr. 9, 2021.

*Primary Examiner* — Michael A Lyons
*Assistant Examiner* — Omar H Nixon
(74) *Attorney, Agent, or Firm* — Carlson, Gaskey & Olds, P.C.

(57) ABSTRACT

A combined capability sensor includes a first laser source and a second laser source. The first laser source is configured to emit light having a wavelength in at least one of an infrared spectrum and a visible spectrum and the second laser source is configured to emit light having a wavelength in a blue or ultraviolet spectrum. A director is configured to direct the first and second laser source to a detection zone. A first sensor is configured to detect scattered light originating from the first laser source, thereby detecting a presence of smoke in the detection zone. A second sensor is configured to detect fluoresced light originating from the second laser source, thereby detecting a presence of a biological agent in the detection zone.

18 Claims, 4 Drawing Sheets

(58) Field of Classification Search
USPC .......................................................... 356/438
See application file for complete search history.

(56) References Cited

U.S. PATENT DOCUMENTS

| | | | |
|---|---|---|---|
| 8,024,135 B2 | 9/2011 | Lee et al. | |
| 9,541,501 B2 | 1/2017 | Allemann et al. | |
| 9,600,989 B2 | 3/2017 | Fadell et al. | |
| 9,651,485 B1 | 5/2017 | Warren et al. | |
| 9,666,049 B2 | 5/2017 | Aebersold | |
| 9,767,665 B2 | 9/2017 | Allemann et al. | |
| 9,799,186 B2 | 10/2017 | Rennie | |
| 2003/0076281 A1* | 4/2003 | Morgan | F21S 10/00 345/44 |
| 2006/0231771 A1 | 10/2006 | Lee et al. | |
| 2010/0014088 A1* | 1/2010 | Wiki | G01N 21/253 356/432 |
| 2014/0247444 A1* | 9/2014 | Babico | G01N 15/1459 356/72 |
| 2015/0096170 A1 | 4/2015 | Mittleman et al. | |
| 2015/0170490 A1 | 6/2015 | Shaw | |
| 2015/0346086 A1* | 12/2015 | Erdtmann | G01N 21/274 250/574 |
| 2017/0184447 A1* | 6/2017 | Matsunami | G01N 21/53 |
| 2017/0200358 A1 | 7/2017 | Fang et al. | |
| 2018/0149590 A1 | 5/2018 | Erdtmann | |
| 2018/0252654 A1 | 9/2018 | Lincoln et al. | |
| 2019/0145883 A1 | 5/2019 | Burriel et al. | |

FOREIGN PATENT DOCUMENTS

| | | | |
|---|---|---|---|
| CN | 102116729 A * | 7/2011 | |
| DE | 102019208841 | 9/2019 | |
| EP | 0978718 | 2/2000 | |
| EP | 3561489 | 10/2019 | |
| WO | 9957529 | 11/1999 | |
| WO | WO-03106965 A2 * | 12/2003 | ......... G01N 15/0205 |
| WO | 2015036204 | 3/2015 | |
| WO | 2015151502 | 10/2015 | |
| WO | 2018226567 | 12/2018 | |

* cited by examiner

FLUORESCENCE ENHANCED LIDAR BASED PARTICULATE DETECTOR

TECHNICAL FIELD

The present disclosure relates generally to particulate detectors, such as smoke and/or biological particulate detectors, and more particularly to a combined capability detector for detecting smoke and biological particulates.

CROSS-REFERENCE TO RELATED APPLICATION

This application claims priority to U.S. Provisional patent Application No. 62/943,841 filed on Dec. 5, 2019.

BACKGROUND

Commercial building systems typically include systems for detecting smoke and other fire related hazards that may occur within the building. Such systems typically do not include capabilities for detecting and responding to hazardous biological or chemical agents. Further, some smoke detection systems cannot discriminate between smoke and biological particulates and can inadvertently trigger a fire response in the presence of a biological particulate.

SUMMARY OF THE INVENTION

In one example, a combined capability sensor includes a first laser source and a second laser source, the first laser source being configured to emit light having a wavelength in at least one of an infrared spectrum and a visible spectrum and the second laser source being configured to emit light having a wavelength in a blue or ultraviolet spectrum, a director configured to direct the first and second laser source to a detection zone, a first sensor configured to detect scattered light originating from the first laser source, thereby detecting a presence of smoke in the detection zone, and a second sensor configured to detect fluoresced light originating from the second laser source, thereby detecting a presence of a biological agent in the detection zone.

In another example of the above combined capability sensor, the director comprises an off axis parabola including a laser light hole and a receiving surface.

In another example of any of the above combined capability sensors, the receiving surface is angled such that light scattered and/or fluoresced in the detection zone is directed to the first sensor and the second sensor.

In another example of any of the above combined capability sensors, light reflected by the receiving surface is directed to a dichroic filter, the dichroic filter being configured to pass light originating from the first laser source and reflect light originating from the second laser source.

In another example of any of the above combined capability sensors, the dichroic filter is configured to redirect reflected light to the second sensor.

In another example of any of the above combined capability sensors, light originating from the first laser source and light originating from the second laser source is directed to a dichroic combiner, and the dichroic combiner redirects the light to the detection zone.

In another example of any of the above combined capability sensors, the director comprises a first dichroic filter, a second dichroic filter and a lens, with the first dichroic filter the second dichroic filter and the lens being linearly arranged, the first dichroic filter reflecting light having a wavelength in the at least one of the infrared spectrum and the visible spectrum and the second dichroic filter reflecting light in the blue or ultraviolet wavelength, the second dichroic filter passing light in the at least one of the infrared spectrum and the visible spectrum.

In another example of any of the above combined capability sensors, each of the first dichroic filter and the second dichroic filter redirect light to the lens.

In another example of any of the above combined capability sensors, the lens is configured to focus received light on at least one emitter fiber of a fiber optic bundle.

In another example of any of the above combined capability sensors, the fiber optic bundle comprise a central fiber and a plurality of surrounding fibers disposed about the central fiber.

In another example of any of the above combined capability sensors, the central fiber is a detector fiber and the plurality of surrounding fibers are emitter fibers.

In another example of any of the above combined capability sensors, the central fiber is an emitter fiber and the plurality of surrounding fibers are detector fibers.

In another example of any of the above combined capability sensors, the central fiber is an emitter fiber and a detector fiber and the plurality of surrounding fibers are detector fibers.

In another example of any of the above combined capability sensors, the plurality of surrounding fibers includes at least one infrared and/or visible detector fiber and a remainder of the surrounding fibers comprise blue or ultraviolet detector fibers, and wherein the at least one infrared and/or visible detector fiber is connected to the first sensor.

In another example of any of the above combined capability sensors, each of the blue or ultraviolet detector fibers directs fluoresced light through the lens and the first dichroic filter and the second dichroic filter to the second sensor.

In another example of any of the above combined capability sensors, the second sensor comprises a bandpass filter and a lens, wherein the lens focuses light passed through the band pass filter on a sensing element.

Another example of any of the above combined capability sensors further includes a projector module disposed at an end of the fiber optic bundle, the projector module including a parabolic mirror configured to direct light emitted from the fiber optic bundle to the detection zone.

In one example, a building hazard detection system includes a plurality of combined capability sensors disposed throughout the building, each of the combined capability sensors being configured to detected a presence of smoke and a presence of a biological agent, and a central building system in communication with each of the plurality of combined capability sensors.

In another example of the above building hazard detection system each of the combined capability sensors includes a first laser source and a second laser source, the first laser source being configured to emit light having a wavelength in at least one of an infrared spectrum and a visible spectrum and the second laser source being configured to emit light have a wavelength in a blue or ultraviolet spectrum, a director configured to direct the first and second laser source to a detection zone, and a first sensor configured to detect scattered light originating from the first laser source, thereby detecting a presence of smoke in the detection zone, and a second sensor configured to detect fluoresced light originating from the second laser source, thereby detecting a presence of a biologic agent in the detection zone.

In another example of the above building hazard detection system each of the combined capability sensors includes a first dichroic filter, a second dichroic filter and a lens, with the first dichroic filter the second dichroic filter and the lens being linearly arranged, the first dichroic filter reflecting light having a wavelength in the at least one of the infrared spectrum and the visible spectrum and the second dichroic filter reflecting light in the blue or ultraviolet wavelength, the second dichroic filter passing light in the at least one of the infrared spectrum and the visible spectrum.

These and other features of the present invention can be best understood from the following specification and drawings, the following of which is a brief description.

DETAILED DESCRIPTION

Figure 1:
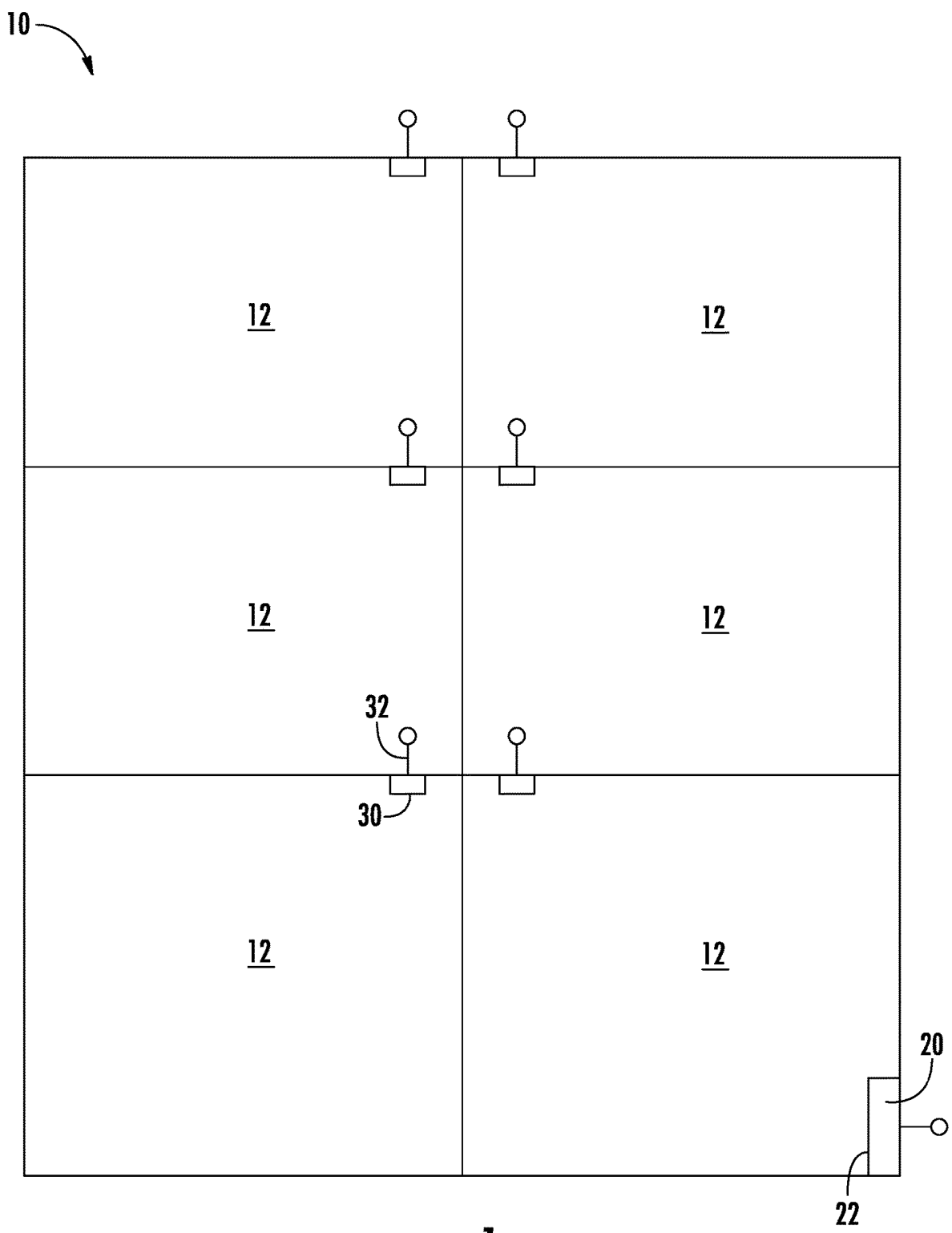
FIG. 1 illustrates a high level schematic view of a building fire and biological detection system.

FIG. 1 schematically illustrates an exemplary hazard detection system 20 for a building 10. The hazard detection system 20 is connected to multiple sensors 30 disposed throughout rooms 12 of the building 10. Each of the sensors 30 is connected to a base unit 22 via a communication link 32. In some examples, the sensors 30 can include sensing nodes distributed about a zone (e.g. a room 12), with each of the nodes connected to a sensor package via a fiber optic network which couples the light from the nodes to the sensor package. The communication link 32 is, in some examples, a wireless communication system. In alternative examples, the communication link 32 is a direct wired connection to the base unit 22 through the building 10. Alternative embodiments utilizing any other method of communicating between the sensors 30 and the base unit 22 are envisioned and can be created with only minimal adaption of the sensors 30 disclosed herein.

Each of the sensors 30 may provide a dual-role by being able to detect biological particulate via fluorescence enhanced LIDAR particulate detection, and being able to detect smoke via light scattering based detection. The dual sensing capabilities further allows the sensors 30, or the hazard detection system 20 to discriminate between the two types of hazards (based on the different characteristics each type presents as described below), and provide an appropriate alarm and/or other response when a hazard is detected. Fluorescence enhanced LIDAR uses fluorescence spectroscopy implemented over a short range for high sensitivity to target particles and/or a long range with localization of remote particles at relatively decreased sensitivity to target particles.

The biological particle detection portion of the sensor 30 uses a UV or blue laser diode to excite the biological particles in the fluorescence excitation wavelength band, and fluorescence emission from the excited biological particles is detected. The smoke detection portion of the sensor 30 uses a visible or infrared laser diode light source with a pulsed LIDAR detection scheme.

The combined capability sensor 30 provides a trigger for responding to a microbial or biological hazard at a low cost to enable an appropriate response from the building systems.

Figure 2:
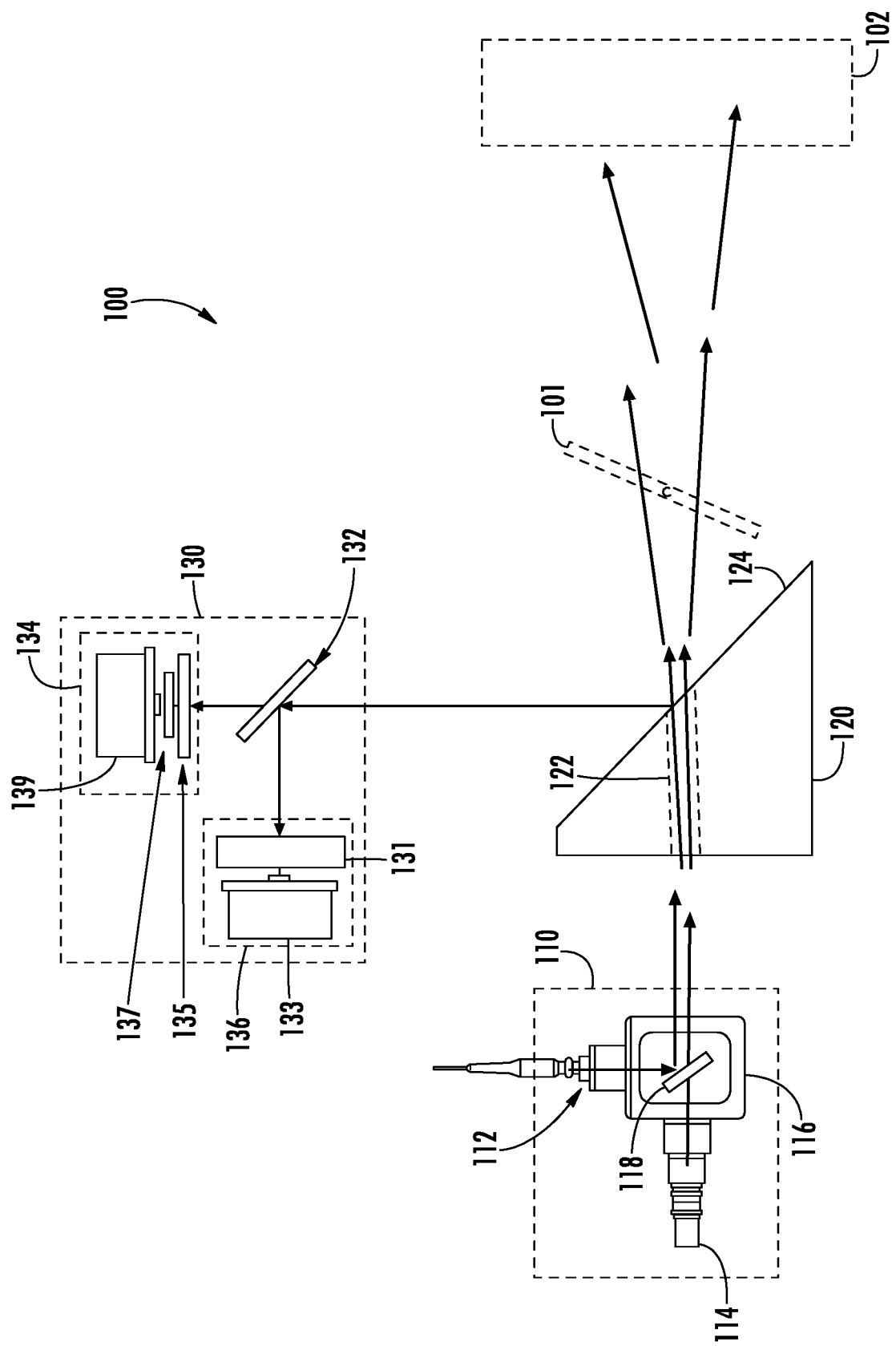
FIG. 2 schematically illustrates an exemplary combined capability sensor according to a first embodiment.

With continued reference to FIG. 1, FIG. 2 schematically illustrates an exemplary free-space configuration for a combined capability sensor 100 configured to sense both smoke and biological hazards within a detection zone 102. The free-space configuration includes multiple components that are disposed relative to each other within the sensor 100. A first component is a light source 110 including a UV/blue laser 112 and a visible (green/red) or infrared (IR) laser diode 114. Each of the UV laser 112 and the laser diode 114 are directed toward a dichroic combiner 116. The dichroic combiner 116 includes a dichroic filter 118 that allows light of the laser diode 114 frequency through, and reflects light of the UV/blue laser 112 frequency. By angling the dichroic filter 118, the light emitted from each of the UV/blue laser 112 and the laser diode 114 is combined into and directed from the dichroic combiner 116 to an off axis parabola 120.

The light from the dichroic combiner 116 is passed through an aligned hole 122 in the off axis parabola 120 and into the detection zone 102. In some examples, a rotating mirror 101 can be added after the parabola, thereby allowing the light to be swept across a larger area, increasing the size of the detection zone 102. Any particulate(s) within the detection zone 102 scatters and/or fluoresces the light back toward a receiving surface 124 of the off axis parabola 120. The receiving surface 124 is angled such that light returned to the off axis parabola is directed toward a sensor configuration 130. The light reflected from the receiving surface 124 is directed to a fluorescence/lidar dichroic 132 within the sensor configuration 130. The fluorescence/lidar dichroic 132 allows scattered light from smoke and biological particles to pass through the dichroic 132 and into a lidar detector 134. The lidar detector 134 may include a bandpass filter 135, a pinhole 137 and a detector 139, although any other lidar detector configuration can be used to similar effect. The fluorescence/lidar dichroic 132 reflects the wavelengths fluoresced by biological agents, and the fluoresced light is passed to a fluorescence detector 136 within the sensor configuration 130. The fluorescence detector 136 includes a fluorescence filter 131 and a fluorescence detector 133 arranged linearly.

Due to the inclusion of the hole 122 in the off axis parabola 120, a detection blind spot is created in the sensed area 102. The blind spot corresponds to the portion of the receiving surface 124 where the pass through hole 122 opens, as no light is reflected off the pass through hole 122 opening. In some embodiments and/or uses, the presence of the blind spot is acceptable, for example in long range detection. In alternative examples, such as high sensitivity short-range detection, the blind spot results in unacceptable performance of the combined capability sensor 100, and an alternative configuration is utilized.

Figure 3:
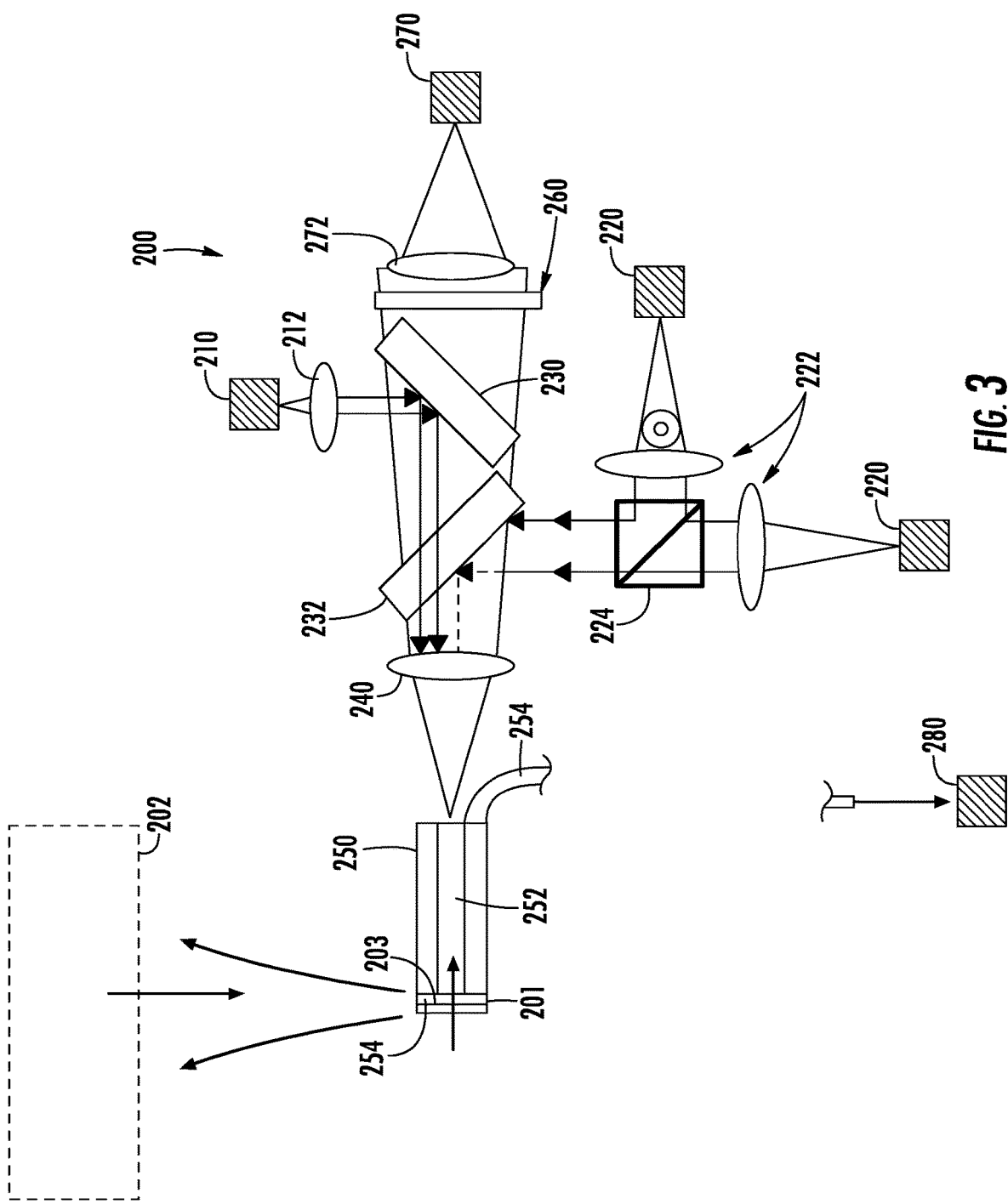
FIG. 3 schematically illustrates an exemplary combined capability sensor according to second embodiment.

With continued reference to FIGS. 1 and 2, FIG. 3 schematically illustrates an alternate combined capability sensor 200 configuration that does not result in a blind spot within a detection zone 202. The combined capability sensor 200 includes a green/red or infrared (IR) laser diode 210 configured to generate green/red or infrared light wavelengths for smoke detection. In one example, the green/red or IR diode is an approximately 130 mW diode. In other examples, other diodes configured to emit light in the green/red or IR wavelengths can be utilized. The laser from laser diode 210 is directed at a lens 212. The combined capability sensor 200 also includes two blue or ultraviolet (UV) laser diodes 220. In one example, the blue or UV diodes 220 are approximately 70 mW diodes. In alternative examples, other diodes configured to emit light in the blue or UV wavelengths can be utilized. Light from the first laser diode is S-polarized and is then collimated using lens 222, while light from the second UV/blue diode is P-polarized is then collimated using lens 222. The distinctly polarized light is combined into a single beam, and redirected using a polarization beam combiner 224. In alternative examples, where a more powerful UV/blue laser diode is utilized, a single UV/blue laser diode can provide sufficient power and be directed without the utilization of the polarization beam combiner 224. In such an example only a single UV/blue diode 222 is included and the polarization lenses 222 and the polarization combiner 224 are omitted.

IR or green/red wavelength light is directed through the lens 212 to a first dichroic reflector 230 that reflects the IR and green/red wavelengths, while allowing blue/UV wavelengths to pass through the dichroic reflector 230. The first dichroic reflector 230 reflects and redirects the IR or green/red wavelength light towards a focusing lens 240 and through a second dichroic reflector 232. The second dichroic reflector 232 is configured to reflect UV/blue light of the wavelength emitted from the UV/blue lasers 220. The UV/blue laser reflected from the second dichroic 232 as well as the IR or green/red laser being passed through the second dichroic 232 is focused via a lens 240. The light is focused into at least one fiber 252 of a fiber bundle 250. The fiber bundle 250 is a bundle of fiber optic cables configured to transmit light along the length of the cable.

A projector module 201 is disposed at the end of the fiber bundle 250. The projector module includes a parabolic mirror 203 and facilitates the direction of the light emitted from the fiber bundle 250 to the detection zone 202. In some examples, the parabolic mirror 203 is static and covers a statically defined detection zone 202. In alternative examples, the parabolic mirror 203 is connected to a motor, or other rotational input, and facilitates sweeping the light output by the fiber bundle 250 thereby increasing the size of the detection zone 202. In some examples, the projector module 201 is configured to move the position of the fiber longitudinally relative to the parabolic mirror 201. The movement allows the sensor system to adjust focus or to achieve collimation.

Figure 4A:
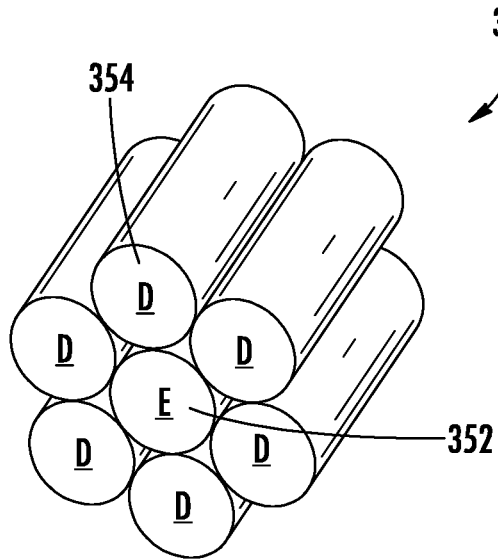
FIG. 4A illustrates an exemplary fiber bundle configuration for the combined capability sensor of FIG. 3.
Figure 4B:
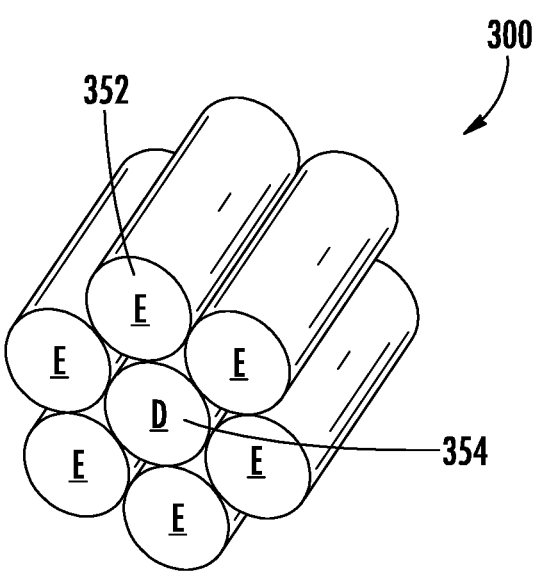
FIG. 4B illustrates an exemplary fiber bundle configuration for the combined capability sensor of FIG. 3.
Figure 4C:
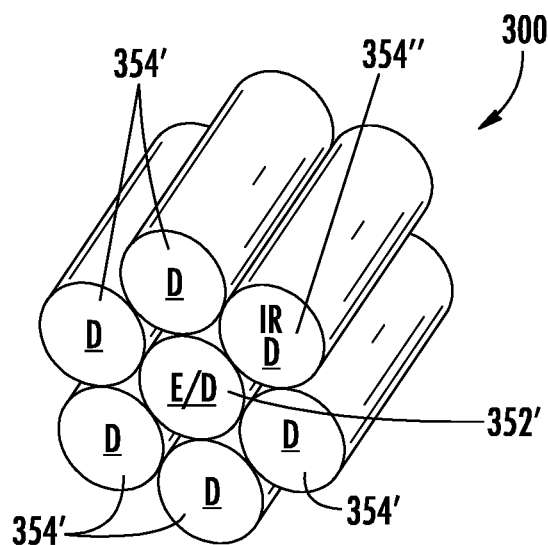
FIG. 4C illustrates an exemplary fiber bundle configuration for the combined capability sensor of FIG. 3.

In one example the fiber bundle 250 is a seven fiber bundle 250 including a single central fiber surrounded circumferentially by six fibers. Such a configuration is illustrated in FIGS. 4A, 4B, and 4C. Although seven fibers as illustrated, other configurations and numbers of optical fibers may be included in the fiber bundle 250.

In some alternative embodiments the fiber(s) 252 receiving the lasers transmit the laser to an emitter end 254 and the light is emitted to the detection zone 202 in the case that no projector module 201 is included. Otherwise the light is incident on the parabolic mirror 203 and the parabolic mirror 203 focuses the light to the detection zone 202. Light scattered and/or fluoresced by particles in the detection zone 202 is returned to the fiber bundle 250, or the projector module 201, or lensed fiber bundle and enters detector fibers within the bundle 250. A portion of the detector fibers are UV/blue detector fibers and direct the light scattered and/or fluoresced from the detection zone 202 back to the lens 240. Light fluoresced from biological agents is the correct wavelength to pass through both dichroic mirrors 232, 230 and is directed to a bandpass filter 260. In one example, the bandpass filter is configured to allow light in the range of 430 nm to 470 nm to pass through. Practical implementations can tailor the pass through range of the bandpass filter to correspond to the correct light frequency of the biological agent being detected. Once passed through the bandpass filter 260, the reflected light is focused onto a fluorescence detector 270 via a lens 272.

To provide for smoke detection, one (or more) of the detector fibers 245 in the fiber optic bundle 250 is routed to an infrared or red smoke detector 280.

With continued reference to the example of FIG. 3, FIGS. 4A, 4B and 4C illustrate exemplary fiber bundle configurations for the combined capability sensor 200 of FIG. 3. In the example of FIG. 4A, the center fiber 352 is an emitter fiber (labeled "E") and the outgoing light from the combined capability sensor 200 is focused into the emitter fiber 352 alone. In this example, the emitter fiber 352 is separated from the bundle 300 at the light source to allow for light to be directly coupled into the emitter fiber 352. The surrounding fibers 354 are detector fibers (labeled "D"), and receive the scattered and/or fluoresced light from the detection zone 202.

FIG. 4B illustrates an inverted configuration, where there is a single detector fiber 354 in the center of the fiber bundle 300, with the detector fiber 354 being surrounded by emitter fibers 352. In this example, the emitter fibers 352 would be removed from the bundle 300 at the light source and the light source would be directly coupled into the emitter fibers 352 in any conventional coupling configuration. In the example of FIG. 4B, the detector fiber 354 being in the center requires an additional splitting element downstream to split the light received in the detector fiber 354 between the fluorescence detector 270 and the infrared/red detector 280.

FIG. 4C illustrates an adaption of the example of FIGS. 4A and 4B, also including the single emitter/receiver 352 positioned in the center of the fiber bundle 300 with five of the surrounding detector fibers 354' being UV/blue detectors configured to direct the received light to the fluorescence sensor 270. One of the emitters 354" is a dedicated infrared or green/red detector (labeled "IR D") and directs the received light to the smoke detector 280. In the example of FIG. 4C, the five UV/blue detector fibers 354' in addition to the light collected by the center fiber eliminates the would-be blind spot generated by the emitter fiber 352, and results in no blind spot in the detection zone 202.

With reference now to the examples of FIGS. 2 and 3, the combination of features configured to direct light from the origination source to the detection zone is generally referred to as a "director", with the specific construction of the director varying depending on the embodiment being utilized.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:
1. A combined capability sensor comprising:
a first laser source and a second laser source, the first laser source being configured to emit light having a wavelength in at least one of an infrared spectrum and a visible spectrum and the second laser source being configured to emit light having a wavelength in a blue or ultraviolet spectrum;
a director configured to direct the first and second laser source to a detection zone;

wherein light originating from the first laser source and light originating from the second laser source is directed to a dichroic combiner, and the dichroic combiner redirects the light to the detection zone;
a first sensor configured to detect scattered light originating from the first laser source, thereby detecting a presence of smoke in the detection zone; and
a second sensor configured to detect fluoresced light originating from the second laser source, thereby detecting a presence of a biological agent in the detection zone.

2. The combined capability sensor of claim 1, wherein the director comprises an off axis parabola including a laser light hole and a receiving surface.

3. The combined capability sensor of claim 2, wherein the receiving surface is angled such that light scattered and/or fluoresced in the detection zone is directed to the first sensor and the second sensor.

4. The combined capability sensor of claim 3, wherein light reflected by the receiving surface is directed to a dichroic filter, the dichroic filter being configured to pass light originating from the first laser source and reflect light originating from the second laser source.

5. The combined capability sensor of claim 4, wherein the dichroic filter is configured to redirect reflected light to the second sensor.

6. A combined capability sensor comprising:
a first laser source and a second laser source, the first laser source being configured to emit light having a wavelength in at least one of an infrared spectrum and a visible spectrum and the second laser source being configured to emit light having a wavelength in a blue or ultraviolet spectrum;
a director configured to direct the first and second laser source to a detection zone, the director comprising a first dichroic filter, a second dichroic filter and a lens, with the first dichroic filter the second dichroic filter and the lens being linearly arranged, the first dichroic filter reflecting light having a wavelength in the at least one of the infrared spectrum and the visible spectrum and the second dichroic filter reflecting light in the blue or ultraviolet wavelength, the second dichroic filter passing light in the at least one of the infrared spectrum and the visible spectrum;
a first sensor configured to detect scattered light originating from the first laser source, thereby detecting a presence of smoke in the detection zone; and
a second sensor configured to detect fluoresced light originating from the second laser source, thereby detecting a presence of a biological agent in the detection zone.

7. The combined capability sensor of claim 6 wherein each of the first dichroic filter and the second dichroic filter redirect light to the lens.

8. The combined capability sensor of claim 7, wherein the lens is configured to focus received light on at least one emitter fiber of a fiber optic bundle.

9. The combined capability sensor of claim 8, wherein the fiber optic bundle comprise a central fiber and a plurality of surrounding fibers disposed about the central fiber.

10. The combined capability sensor of claim 9, wherein the central fiber is a detector fiber and the plurality of surrounding fibers are emitter fibers.

11. The combined capability sensor of claim 9, wherein the central fiber is an emitter fiber and the plurality of surrounding fibers are detector fibers.

12. The combined capability sensor of claim 9, wherein the central fiber is an emitter fiber and a detector fiber and the plurality of surrounding fibers are detector fibers.

13. The combined capability sensor of claim 12, wherein the plurality of surrounding fibers includes at least one infrared and/or visible detector fiber and a remainder of the surrounding fibers comprise blue or ultraviolet detector fibers, and wherein the at least one infrared and/or visible detector fiber is connected to the first sensor.

14. The combined capability sensor of claim 13, wherein each of the blue or ultraviolet detector fibers directs fluoresced light through the lens and the first dichroic filter and the second dichroic filter to the second sensor.

15. The combined capability sensor of claim 14, wherein the second sensor comprises a bandpass filter and a lens, wherein the lens focuses light passed through the band pass filter on a sensing element.

16. The combined capability sensor of claim 8, further comprising a projector module disposed at an end of the fiber optic bundle, the projector module including a parabolic mirror configured to direct light emitted from the fiber optic bundle to the detection zone.

17. A building hazard detection system comprising:
a plurality of combined capability sensors disposed throughout the building, each of the combined capability sensors being configured to detected a presence of smoke and a presence of a biological agent each of the combined capability sensors comprising:
a first laser source and a second laser source, the first laser source being configured to emit light having a wavelength in at least one of an infrared spectrum and a visible spectrum and the second laser source being configured to emit light having a wavelength in a blue or ultraviolet spectrum;
a director configured to direct the first and second laser source to a detection zone, the director comprising a first dichroic filter, a second dichroic filter and a lens, with the first dichroic filter the second dichroic filter and the lens being linearly arranged, the first dichroic filter reflecting light having a wavelength in the at least one of the infrared spectrum and the visible spectrum and the second dichroic filter reflecting light in the blue or ultraviolet wavelength, the second dichroic filter passing light in the at least one of the infrared spectrum and the visible spectrum;
a first sensor configured to detect scattered light originating from the first laser source, thereby detecting a presence of smoke in the detection zone;
a second sensor configured to detect fluoresced light originating from the second laser source, thereby detecting a presence of a biological agent in the detection zone; and
a central building system in communication with each of the plurality of combined capability sensors.

18. The building hazard detection system of claim 17, wherein each of the combined capability sensors comprises:
a first laser source and a second laser source, the first laser source being configured to emit light having a wavelength in at least one of an infrared spectrum and a visible spectrum and the second laser source being configured to emit light have a wavelength in a blue or ultraviolet spectrum;
a director configured to direct the first and second laser source to a detection zone, the director comprises a first dichroic filter, a second dichroic filter and a lens, with the first dichroic filter the second dichroic filter and the lens being linearly arranged, the first dichroic filter reflecting light having a wavelength in the at least one of the infrared spectrum and the visible spectrum and the second dichroic filter reflecting light in the blue or ultraviolet wavelength, the second dichroic filter passing light in the at least one of the infrared spectrum and the visible spectrum; and a first sensor configured to detect scattered light originating from the first laser source, thereby detecting a presence of smoke in the detection zone; and a second sensor configured to detect fluoresced light originating from the second laser source, thereby detecting a presence of a biologic agent in the detection zone.

\* \* \* \* \*